Patented Oct. 25, 1949

2,486,183

UNITED STATES PATENT OFFICE 2,486,183

EMULSION POLYMERIZATION OF BUTADIENE IN THE PRESENCE OF A SALT OF A DEHYDROGENATED MIDDLE FRACTION OF ROSIN

John H. Long, Marshallton, and Donald H. Sheffield, Wilmington, Del., assignors to Hercules Powder Company, Wilmington, Del., a corporation of Delaware No Drawing. Original application June 17, 1944, Serial No. 540,889. Divided and this application March 24, 1948, Serial No. 16,887

10 Claims. (Cl. 260—83.7)

This invention relates to an improved process for the emulsion polymerization of unsaturated compounds and, more particularly, to an improved process of polymerizing compounds to provide synthetic rubberlike materials.

It is well known that unsaturated compounds, particularly those containing the vinyl group, may be advantageously polymerized in aqueous emulsion. For example, synthetic rubberlike materials have been prepared from butadiene hydrocarbons and compounds containing a vinyl group, such as styrene, acrylic acid esters, acrylic acid nitrile, and the corresponding methacrylic acid derivatives, by polymerization in aqueous emulsion with or without the addition of agents capable of accelerating the polymerization process. Polymers such as polyvinyl halides, polyvinyl acetate, polystyrene, polymethyl methacrylate and various other addition polymers have also been prepared by polymerization in aqueous emulsion. Soaps of fatty acids are the most commonly used emulsifying agents for polymerizations of this type.

Fatty acid soaps, although effective emulsifying agents for the polymerization of vinyl compounds, are not sufficiently water-soluble and are, therefore, quite difficult to remove from the polymerization products. The presence of fatty acids in the polymer has many disadvantages. Their presence in transparent plastic materials causes cloudiness. In the case of rubberlike polymers, the fatty acid soap remaining in the polymer is converted to free fatty acid, when salt and acid are added in precipitating the polymer, as is commonly done. Fatty acids weaken the rubber and must, therefore, be removed from it, and their complete removal is very difficult.

Now in accordance with this invention, it has been found that the alkali metal salts of a fractionated dehydrogenated or disproportionated rosin comprising a distilled fraction of from about 50 to about 90% of a dehydrogenated or disproportionated rosin may be used as emulsifying agents with very advantageous effects for the polymerization of vinyl compounds which are capable of being polymerized in aqueous emulsion by a peroxide type catalyst, the said fractionated dehydrogenated or disproportionated rosin being prepared by contacting a natural rosin with an active hydrogenation catalyst in the absence of added hydrogen at an elevated temperature until it contains at least about 40% of dehydroabietic acid and less than about 1% of abietic acid, subjecting the dehydrogenation or disproportionated rosin to fractional distillation under reduced pressure, removing at least about 5% of the light end, collecting a middle fraction of from about 50 to about 90% of the dehydrogenated or disproportionated rosin and leaving as a residue at least about 5% of the dehydrogenated or disproportionated rosin.

These dehydrogenated or disproportionated rosin soaps not only have the advantage of being readily washed out of the product making possible the production of transparent plastic polymers free from cloudiness, but it has been found that in the case of rubberlike polymers an improved product is obtained if the dehydrogenated rosin acid is precipitated in the polymerized product by the addition of acid. The dehydrogenated or disproportionated rosin soaps prepared as described herein are essentially free from polymerization inhibitors or retarders, thereby making possible the production of the polymers in high yields at a satisfactory rate.

The following examples are illustrative of the improved process and the products thereof in accordance with this invention. All parts given in the examples represent parts by weight.

*Example 1*

Molten N wood rosin was passed over a palladium catalyst (1.25% palladium) supported on activated carbon, the temperature of the catalyst being held at 270° to 290° C. The average time of contact between the rosin and the catalyst was 23 minutes. The dehydrogenated rosin produced contained approximately 50% of dehydroabietic acid.

A charge of 1100 parts of this dehydrogenated rosin was distilled at a pressure of about 5 mm. of mercury. The first cut was made at a vapor temperature of about 250° C., when 19% of the charge had distilled over. The second or middle cut of the dehydrogenated rosin, comprising about 72% of the charge, was taken at a vapor temperature of about 278° C., leaving a distillation residue of 8%.

This middle cut of 72% was saponified and made up to a 2½% aqueous solution with a 200% excess of sodium hydroxide. To 400 parts of this solution, 1.6 parts of isoamyl alcohol, 45 parts of styrene, 136 parts of butadiene and 6 parts of potassium persulfate were added. The mixture was agitated at 50° C. for 16 hours in a sealed container. On addition of a saturated salt solution, a 96% yield of polymer was obtained.

In order to compare the use of the dehydrogenated rosin soap with that of ordinary rosin soaps the following control was run. To 400 parts of a 2½% solution of rosin soap, prepared from N wood rosin, and containing a 200% excess of sodium hydroxide, 6 parts of potassium persulfate, 1.6 parts of isoamyl alcohol, 45 parts of styrene and 136 parts of butadiene were added. On carrying out the polymerization as described above, a 23% yield of polymer was obtained. From these results it may be seen that the use of an alkali metal salt of the middle fraction of dehydrogenated rosin results in a greatly increased yield over that obtained by the use of rosin soap.

Example II

This example was carried out exactly as described in Example I except that 200 parts of a 2½% aqueous solution of fatty acid soap were substituted for one-half of the solution of sodium salt of fractionated dehydrogenated rosin used in that example. The yield of polymer obtained with this mixed emulsifying agent was 89%.

Example III

N wood rosin was distilled at a pressure of about 12 to 25 mm. of mercury. A first cut of 5% was made at a vapor temperature of about 250° C. A second or middle cut, comprising 90% of the charge, was taken at a vapor temperature of 300° C., leaving a distillation residue of 5%.

Ten parts of a palladium catalyst supported on activated carbon were added to 135 parts of the above middle cut of distilled wood rosin at 160° C. The mass was then heated and agitated for 2 hours at 235° to 237° C. The dehydrogenated rosin was dissolved in gasoline, filtered to remove the catalyst and the gasoline removed by distillation.

Ten parts of this dehydrogenated distilled rosin in 400 parts of water were neutralized with sodium hydroxide. To this neutral soap solution 0.6 part of potassium persulfate, 1 part of lauryl mercaptan, 50 parts of styrene and 150 parts of butadiene were added. The mixture was agitated at 50° C. for 14 hours in a sealed container. The emulsion was then run into an open vessel containing 20 parts of a 2% aqueous solution of phenyl-β-naphthylamine, stripped of the excess butadiene and the polymer precipitated by the addition of an excess of a saturated salt solution. The precipitated polymer was washed with water until alkali free, then with alcohol and finally was dried to constant weight on a mill. An 81% yield of polymer was obtained.

Example IV

To 400 parts of 2½% aqueous solution of the sodium salt of fractionated dehydrogenated rosin, prepared as described in Example I but containing a 100% excess of alkali, 3 parts of a 60% solution of tert-butyl hydroperoxide in tert-butyl alcohol, 45 parts of styrene, and 136 parts of isoprene were added. The polymerization was carried out as described in Example 1. A 98% yield of polymer was obtained.

Example V

To 1000 parts of molten Nelio gum rosin, 100 parts of a palladium catalyst supported on activated carbon were added. The batch was heated in a nitrogen atmosphere at 260° to 285° C. for 1 hour.

The dehydrogenated Nelio gum rosin, 1100 parts, was mixed with 33 parts of maleic anhydride and heated, with agitation, at 170° to 180° C. for 4 hours in an atmosphere of carbon dioxide. The product was fractionally distilled at 3 mm. pressure and fractions were collected as given in the following table. The temperatures are vapor temperatures at 3 mm. pressure.

Butadiene-styrene copolymers were prepared exactly as described in Example I except that the various fractions obtained above were substituted for the dehydrogenated rosin soap used in that example. The yields of polymer for each fraction are given in the following tabulation.

| Fraction | Vapor Temperature | Per Cent of Total Rosin | Polymer Yield |
|---|---|---|---|
| I | Up to 213° C | 19.6 | 46 |
| II | 213°–226° C | 20.8 | 92 |
| III | 226° C | 24.4 | 83 |
| IV | 226°–234° C | 15.9 | 83 |
| V | Residue | 19.1 | 10 |

As may be seen from the above tabulation the three middle fractions, which could also have been collected as one fraction, show a marked increase in the yield of polymer over that obtained with the first cut or with the residue.

Example VI

Ten parts of the dehydrogenated distilled rosin, described in Example III, in 400 parts of water were neutralized with sodium hydroxide and 5.5 parts of tertiary-butyl hydroperoxide solution (60% peroxide), 150 parts of butadiene and 50 parts of acrylonitrile were added. The mixture was agitated at 50° C. for 14 hours in a sealed container. The polymer was precipitated, washed and dried as described in Example III. A 75% yield of butadiene-acrylonitrile polymer was obtained.

Example VII

Ten parts of the dehydrogenated distilled rosin, described in Example III, in 400 parts of water, were neutralized with sodium hydroxide and 0.2 part of benzoyl peroxide and 200 parts of styrene were added. The mixture was agitated at 50° C. for 16 hours in a sealed container. The polymer was precipitated, washed with water and alcohol and then dried to constant weight in a vacuum oven at 60° C. A 100% yield of polystyrene was obtained.

The rosin soaps described in accordance with this invention are prepared from a fractionated dehydrogenated or disproportionated rosin obtained by contacting wood or gum rosin at a suitable temperature with an active hydrogenation catalyst in the absence of added hydrogen at an elevated temperature until it contains at least 40% of dehydroabietic acid and until less than about 5%, preferably until less than about 1%, of abietic acid remains, and then submitting this dehydrogenated or disproportionated rosin to fractional distillation under reduced pressure to obtain a middle fraction of from about 50 to about 90%. By this procedure, the polymerization inhibitors and retarders usually present in whole dehydrogenated or disproportionated rosin are concentrated in the light end and the distillation residue. The middle cut of about 50 to about 90% is then converted into an alkali metal salt prior to its use as an emulsifying agent. Alternatively, as shown in some of the examples, natural rosin may be fractionally distilled before dehydrogenation or disproportionation and a similar middle cut of rosin then dehydrogenated or disproportionated and converted into an alkali metal salt. The same distillation conditions will apply when this alternative method of preparation is employed.

The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite, etc., are suitable. The catalyst may be supported on a carrier, such as granular alumina, fibrous asbestos, or activated charcoal. Dehydrogenation or disproportionation with a palladium catalyst, for example, may be conducted either by a batchwise or continuous procedure. Thus, the rosin may be agitated with about 5 to about 20% by weight of a palladium catalyst supported on activated carbon (1 to 2% palladium) at about 150° to about 300° C. for about 1 to about 5 hours. In the continuous process, the molten rosin flows over the supported palladium catalyst at a temperature within the range of about 225° to about 300° C. for a period of about one-fourth hour to about 1 hour.

If desired, the dehydrogenated or disproportionated rosin may be hydrogenated, before or after fractional distillation, and before conversion to the alkali metal salt, by contacting the dehydrogenated or disproportionated rosin with hydrogen in the presence of a hydrogenation catalyst at a suitable temperature and pressure.

The dehydrogenated or disproportionated rosin may also be treated with maleic anhydride before fractional distillation as an aid in removing polymerization inhibitors and retarders. This treatment may be accomplished by heating the dehydrogenated or disproportionated rosin and maleic anhydride, usually an amount of from about 1 to about 5% of anhydride by weight of rosin, to a temperature of about 100° to 200° C. for a period of, for example, about 2 hours.

The rosins which may be dehydrogenated or disproportionated for the preparation of these soaps may be gum or wood rosin. The wood rosin may be refined prior to its dehydrogenation, by any suitable method, as by crystallization; treatment with a selective solvent as furfural, phenol, etc.; treatment with an absorbent as fuller's earth, etc.; or a combination of any of these methods. If desired, the rosin may be isomerized, by treatment with an acidic isomerizing agent, prior to dehydrogenation.

The distillation of the dehydrogenated or disproportionated rosin may be conducted either batchwise or on a continuous scale in a flash distillation still. In the latter case, the low end and middle cut are fractionally condensed separately. If the batch distillation procedure is employed, the vapor temperature varies depending upon the amount of middle cut desired, pressure of distillation, type of still, etc., but generally ranges from about 210° to about 275° C., when the distillation pressure is about 5 to about 10 mm. A light end, varying from about 5 to about 30% of the charge, preferably from about 10 to about 20%, depending upon the rosin used for dehydrogenation, conditions of dehydrogenation, etc., is removed and a middle cut comprising about 50 to about 90% of the charge, preferably about 60 to about 80%, is taken. The distillation residue represents from about 5 to about 25% of the charge.

The middle cut of distilled dehydrogenated or disproportionated rosin is converted into an alkali metal salt by neutralization with an alkali metal compound, basic in nature. Among the alkali compounds, basic in nature, suitable for this reaction are the hydroxides, carbonates, etc., of lithium, sodium, potassium, etc. The soap may be prepared in situ, i. e., the distilled dehydrogenated or disproportionated rosin may be added to the monomeric material and a solution of alkali added, or the soap may be incorporated in the polymerization mass in the form of a paste or in the form of a dry soap.

In contrast to fatty acids which weaken synthetic rubbers, the dehydrogenated rosin acids present in the described middle fraction have been found to produce beneficial effects. Synthetic rubbers containing these dehydrogenated rosin acids have definitely improved tensile strength, tack and other processing characteristics. Therefore, these rosin acid soaps do not need to be as completely washed out of the polymeric material and are usually not washed completely out of the product. In fact, an additional amount of the distilled dehydrogenated rosin may be added to the polymer to provide an amount of up to about 10% by weight of polymer, in order to take advantage of the improvements made by the presence of these dehydrogenated rosin acids in the finished product. Even when the latex is coagulated with alcohol and washed to remove the dehydrogenated rosin, the final product is still more plastic and more readily millable than when fatty acid soaps are used.

The dehydrogenated or disproportionated rosin soaps of this invention are free of inhibitors or retarders, these substances having been removed by dehydrogenation and fractional distillation as previously described. As was shown in the foregoing examples, the yield of polymer was increased from about 23% to about 90 to 100% when these emulsifying agents were used in place of rosin soaps. Therefore, these dehydrogenated rosin soaps have the advantageous effects of improving the polymeric material while at the same time greatly increasing the extent of polymerization. In addition to these advantages, the polymer formed is more uniform with respect to tensile properties than when fatty acid soaps are used as the emulsifying agents.

The rubberlike polymers formed by emulsion polymerization of butadiene and styrene in the presence of the described dehydrogenated rosin soaps and containing an amount of dehydrogenated or disproportionated rosin up to about 10%, exhibit exceptionally high tensile strengths and elongations when compounded and vulcanized. They also have, in the unvulcanized state, an increased tack and therefore superior building properties, and the mill behavior is noticeably improved.

Compounds which may be advantageously polymerized in aqueous emulsion by means of these dehydrogenated rosin soaps include butadiene and its derivatives, such as isoprene, dimethylbutadiene, chloroprene, etc., or other compounds containing the vinyl group such as styrene, methacrylic esters, etc. The alkali metal salts of the middle fraction of dehydrogenated rosin have been found to be excellent emulsifying agents, particularly in the preparation of the copolymers of butadiene and styrene or acrylonitrile, isoprene and styrene or acrylonitrile, and other rubberlike copolymers, as well as in the preparation of polymers such as polyvinyl chloride, polyvinyl acetate, polystyrene, polymethyl methacrylate, and the various other addition polymers which may be prepared by the emulsion technique. When these emulsifying agents are used in the polymerization of butadiene and styrene as in Example III, the rubberlike material so produced, and containing free dehydrogenated rosin acids, has better tack in the unvulcanized state and when vulcanized has a greater tensile strength and flex life than that prepared with a fatty acid soap as the emulsifier in the polymerization.

These soaps of the middle fraction of dehydrogenated or disproportionated rosin may be used alone or combined with fatty acid soaps, in an amount of up to about 75% of fatty acid soap, as the emulsifying agent in polymerization by the emulsion technique. Example II illustrates the use of a 50:50 mixture of fatty acid soap and fractionated dehydrogenated rosin soap. One of the advantages in using such a mixed emulsifying agent is that certain of the less expensive fatty acid soaps, which are themselves unsatisfactory for emulsion polymerizations, may be used when used in combination with a soap of the middle fraction of dehydrogenated rosin.

The polymerizations in which the soaps prepared from the middle fraction of dehydrogenated or disproportionated rosin are used may be subjected to the same variations in reaction conditions; e. g., concentration of reactants, temperature, pressure, etc., as those in which a fatty acid soap is used. The temperature of the reaction may vary from about 20° to about 100° C., preferably from about 40° to about 60° C., and the concentration of emulsifying agent may be varied from about 1 to about 5%, usually 2 to 3% is sufficient. The polymerization, in general, is carried out with the aid of a catalyst, such as a peroxide-type catalyst, potassium persulfate, etc. These dehydrogenated rosin soaps may also be used in combination with any desired initiator, or other polymerization or processing aid.

Where in the specification and appended claims the term "dehydrogenated rosin" is used, it is meant to include disproportionated rosin.

This application is a division of our application for United States Letters Patent, Serial No. 540,889, filed June 17, 1944.

What we claim and desire to protect by Letters Patent is:

1. The process which comprises polymerizing in aqueous emulsion a conjugated butadiene hydrocarbon in the presence of between 1 and 5% in the aqueous phase of an alkali metal salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

2. The process which comprises copolymerizing in aqueous emulsion a mixture of a conjugated butadiene hydrocarbon and another organic compound containing the CH₂=C< group and which is capable of being polymerized by a peroxide catalyst in the presence of between 1 and 5% in the aqueous phase of an alkali metal salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

3. The process which comprises copolymerizing in aqueous emulsion a mixture of butadiene-1,3 and styrene in the presence of between 1 and 5% in the aqueous phase of an alkali metal salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

4. The process which comprises copolymerizing in aqueous emulsion a mixture of butadiene-1,3 and acrylonitrile in the presence of between 1 and 5% in the aqueous phase of an alkali metal salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

5. The process which comprises polymerizing in aqueous emulsion a conjugated butadiene hydrocarbon in the presence of between 1 and 5% in the aqueous phase of the sodium salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

6. The process which comprises copolymerizing in aqueous emulsion a mixture of butadiene—1, 3 and styrene in the presence of between 1 and 5% in the aqueous phase of the sodium salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

7. The process which comprises copolymerizing in aqueous emulsion a mixture of butadiene-1, 3 and acrylonitrile in the presence of between 1 and 5% in the aqueous phase of the sodium salt of a dehydrogenated middle fraction of a fractionated rosin, said dehydrogenated middle fraction being prepared by subjecting a natural rosin to distillation under reduced pressure, removing at least 5% of a light end, collecting a middle fraction consisting of from 50% to 90% of the rosin, leaving as a residue at least 5% of the rosin, and contacting said middle fraction of rosin with an active hydrogenation catalyst in the absence of added hydrogen at an elevated temperature until it contains at least 40% of dehydroabietic acid.

8. The process which comprises polymerizing in aqueous emulsion a conjugated butadiene hydrocarbon in the presence of between 1 and 5% in the aqueous phase of the sodium salt of a dehydrogenated middle fraction of a fractionated rosin, said dehydrogenated middle fraction being prepared by subjecting a natural rosin to distillation under reduced pressure, removing at least 10% of a light end, collecting a middle fraction consisting of from 60% to 80% of the rosin, leaving as a residue at least 10% of the rosin, and contacting said middle fraction of rosin with an active hydrogenation catalyst in the absence of added hydrogen at an elevated temperature until it contains at least 40% of dehydroabietic acid.

9. The process which comprises copolymerizing in aqueous emulsion a mixture of butadiene-1, 3 and styrene in the presence of the sodium salt of a dehydrogenated middle fraction of a fractionated rosin, said dehydrogenated middle fraction being prepared by subjecting a natural rosin to distillation under reduced pressure, removing at least 10% of a light end, collecting a middle fraction consisting of from 60% to 80% of the rosin, leaving as a residue at least 10% of the rosin, and contacting said middle fraction of rosin with an active hydrogenation catalyst in the absence of added hydrogen at an elevated temperature until it contains at least 40% of dehydroabietic acid.

10. The process which comprises copolymerizing in aqueous emulsion a mixture of butadiene-1, 3 and acrylonitrile in the presence of the sodium salt of a dehydrogenated middle fraction of a fractionated rosin, said dehydrogenated middle fraction being prepared by subjecting a natural rosin to distillation under reduced pressure, removing at least 10% of a light end, collecting a middle fraction consisting of from 60% to 80% of the rosin, leaving as a residue at least 10% of the rosin, and contacting said middle fraction of rosin with an active hydrogenation catalyst in the absence of added hydrogen at an elevated temperature until it contains at least 40% of dehydroabietic acid.

JOHN H. LONG.
DONALD H. SHEFFIELD.

REFERENCES CITED

The following references are of record in the file of this patent:

UNITED STATES PATENTS

| Number | Name | Date |
| --- | --- | --- |
| 2,216,958 | Pannwitz et al. | Oct 8, 1940 |
| 2,377,647 | Pragoff | June 5, 1945 |
| 2,388,477 | Fryling | Nov. 6, 1945 |

OTHER REFERENCES

Panek: The Rubber Age, April 1943 (pages 35 and 36).

Hercules Powder Co., publication, Naval Stores and the Compounding of Synthetic Rubber, July, 1943, pages 6 and 7.

Hasselstrom et al.: Paper in J. Jan. 25, 1940, pages 41–43.

Ser. No. 371,463, Zerbe (A.P.C.), published April 20, 1943.